United States Patent [19]

Blackner et al.

[11] Patent Number: 5,749,546
[45] Date of Patent: May 12, 1998

[54] METHOD AND APPARATUS FOR REDUCING AIRFRAME AEROSOUND

[75] Inventors: Anthony M. Blackner, Kirkland; Thomas A. Zierten, Bellevue, both of Wash.

[73] Assignee: The Boeing Company, Seattle, Wash.

[21] Appl. No.: 501,246

[22] Filed: Jul. 10, 1995

[51] Int. Cl.$^6$ ........................................ B64C 3/50
[52] U.S. Cl. ........................... 244/215; 244/213; 244/199
[58] Field of Search ........................ 244/215, 199, 244/216, 213, 130

[56] References Cited

U.S. PATENT DOCUMENTS

| | | |
|---|---|---|
| 1,732,642 | 10/1929 | Diehl .................................. 244/215 |
| 1,817,651 | 8/1931 | Schroeder .......................... 244/215 |
| 1,856,157 | 5/1932 | Gassner ............................. 244/216 |
| 1,988,148 | 11/1935 | Weymouth ........................ 244/215 |
| 3,596,854 | 8/1971 | Haney, Jr. . | 
| 4,477,042 | 10/1984 | Griswold, II . |
| 4,712,752 | 12/1987 | Victor . |
| 5,158,252 | 10/1992 | Taylor . |
| 5,388,788 | 2/1995 | Rudolph ............................. 244/215 |

FOREIGN PATENT DOCUMENTS 722752  7/1942  Germany .................................. 244/215

OTHER PUBLICATIONS

S. A McInerny et al., AIAA–86–1918, "An Experimental Investigation of Wing Tip Turbulence with Applications to Aerosound," (AIAA 10th Aeroacoustics Conference) Jul. 9–11, 1986/Seattle, Washington, pp. 1–21.

Miller, Wendell Roger, Flap Noise Characteristics Measured By Pressure Cross–Correlation Techniques, UMI Dissertation Services, Degree Date 1980.

Primary Examiner—Andres Kashnikow
Assistant Examiner—Tien Dinh
Attorney, Agent, or Firm—William C. Anderson

[57] ABSTRACT

A method and apparatus for reducing noise produced by the airframe of an airplane in flight. The present invention provides a smooth, continuous, arcuate surface, such as a rounded edge cap, for the lateral surface of any airplane flap exposed to fluid having relative motion with respect to the airplane. Tests indicate that a rounded flap edge cap made in accordance with the present invention is effective in attenuating noise levels in the middle and high frequency range, i.e., between about 500 to about 10000 Hz.

11 Claims, 7 Drawing Sheets

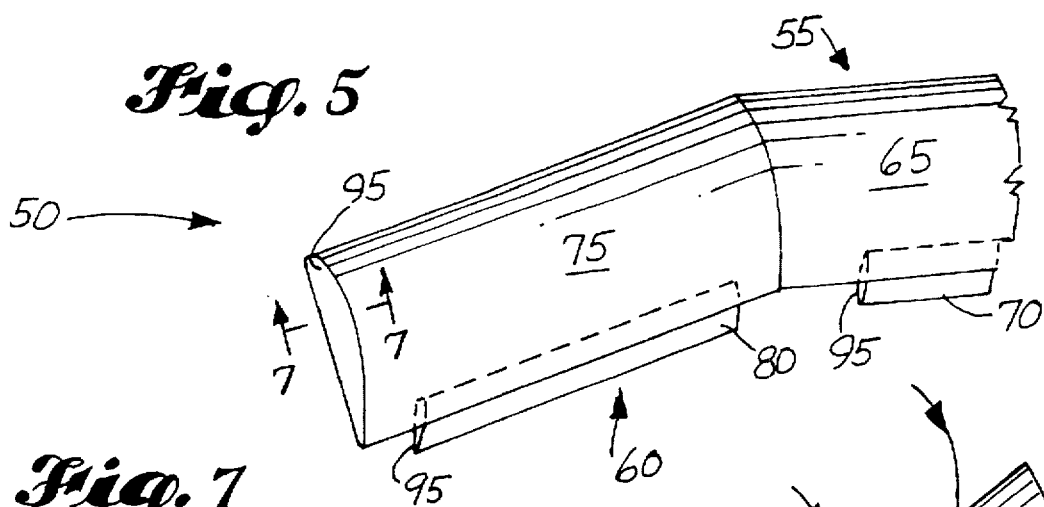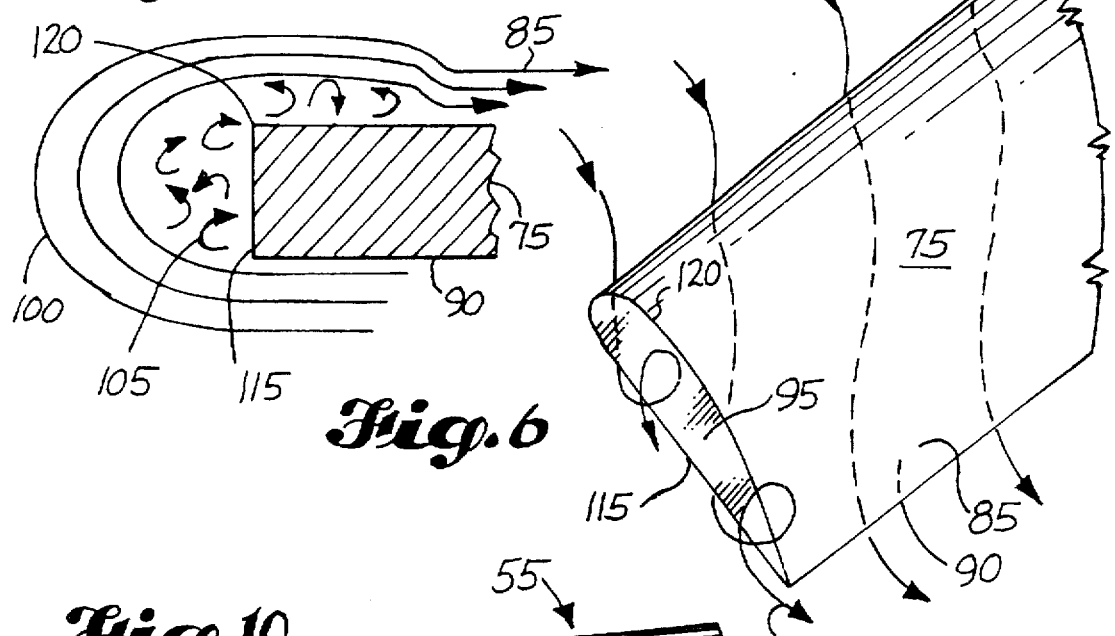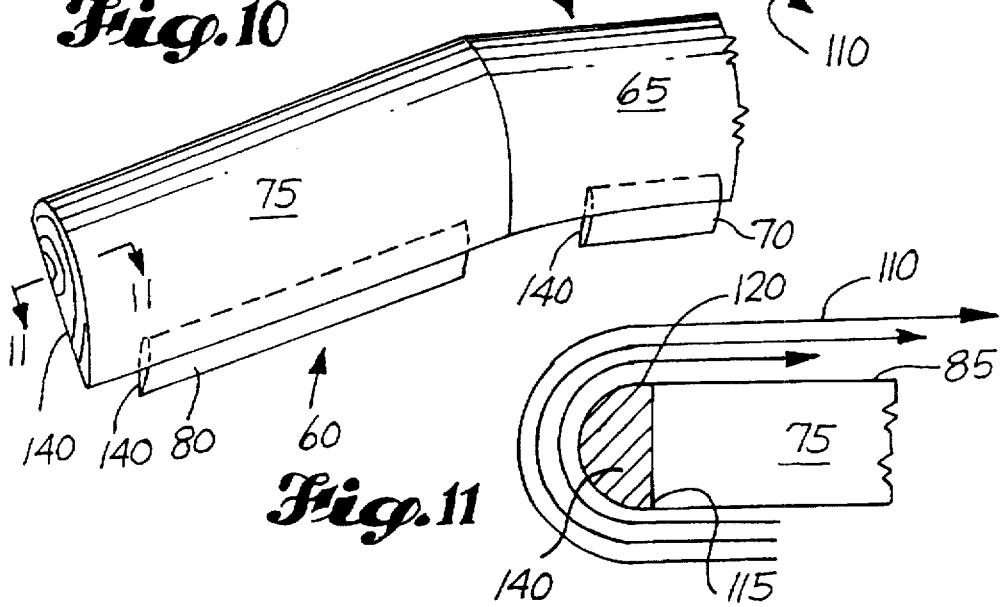

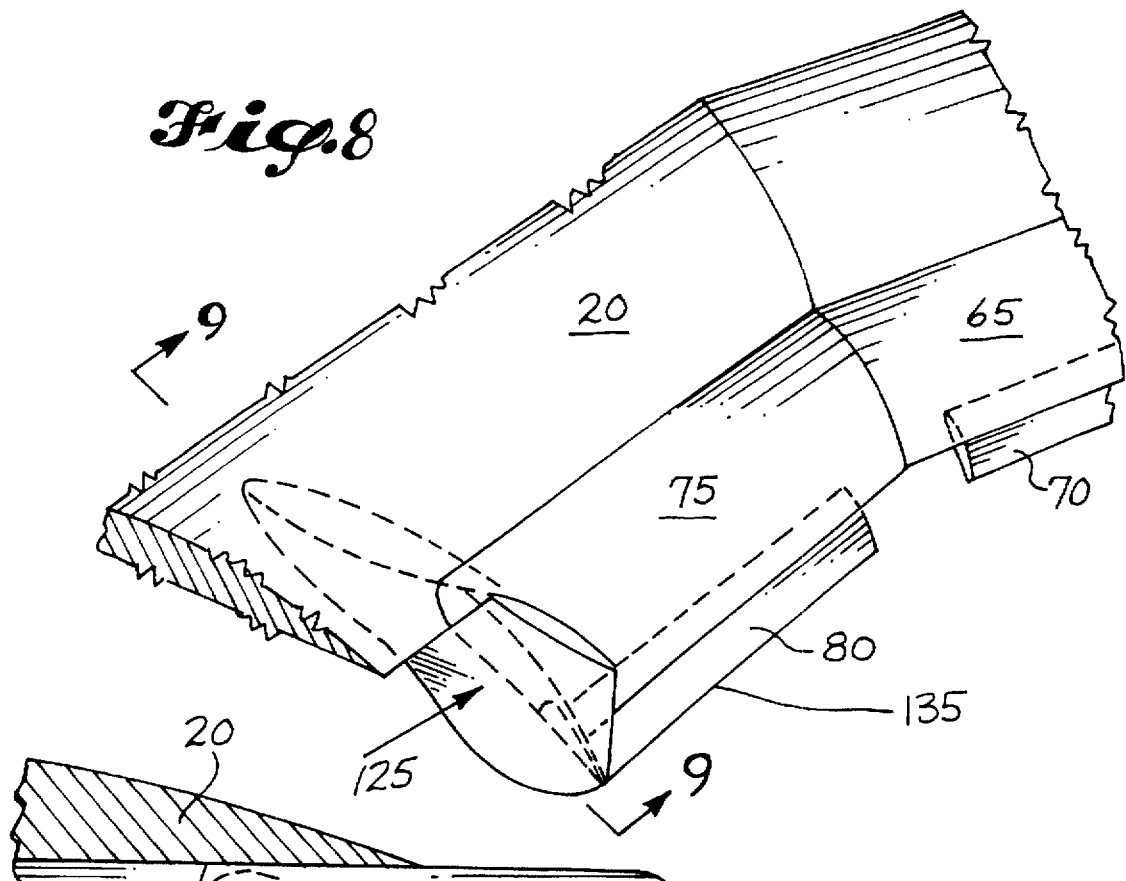
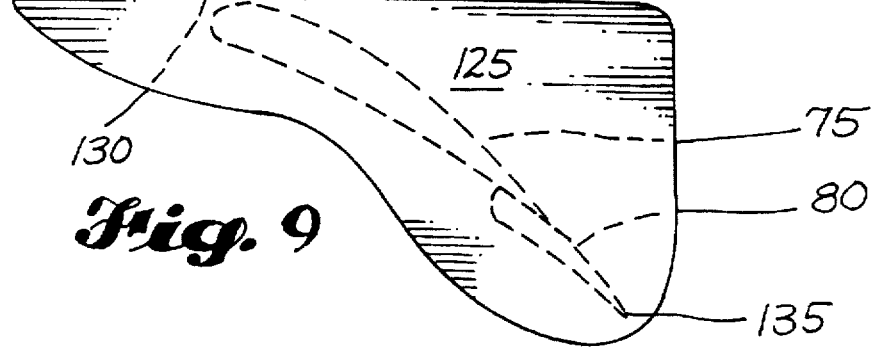

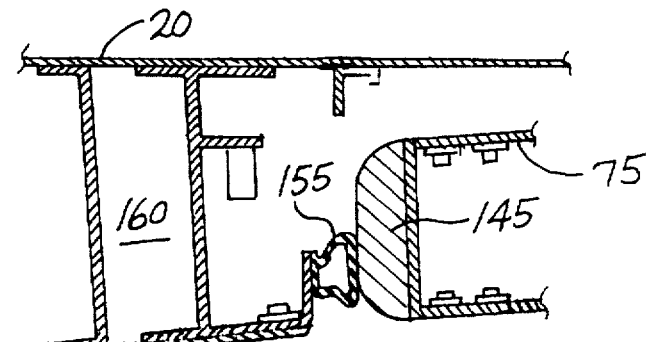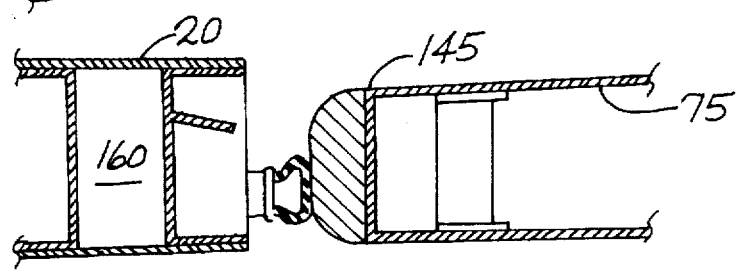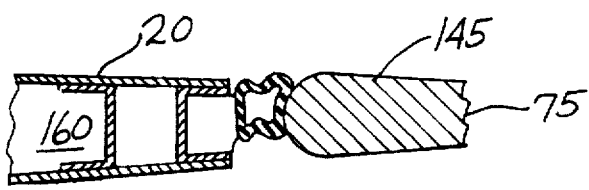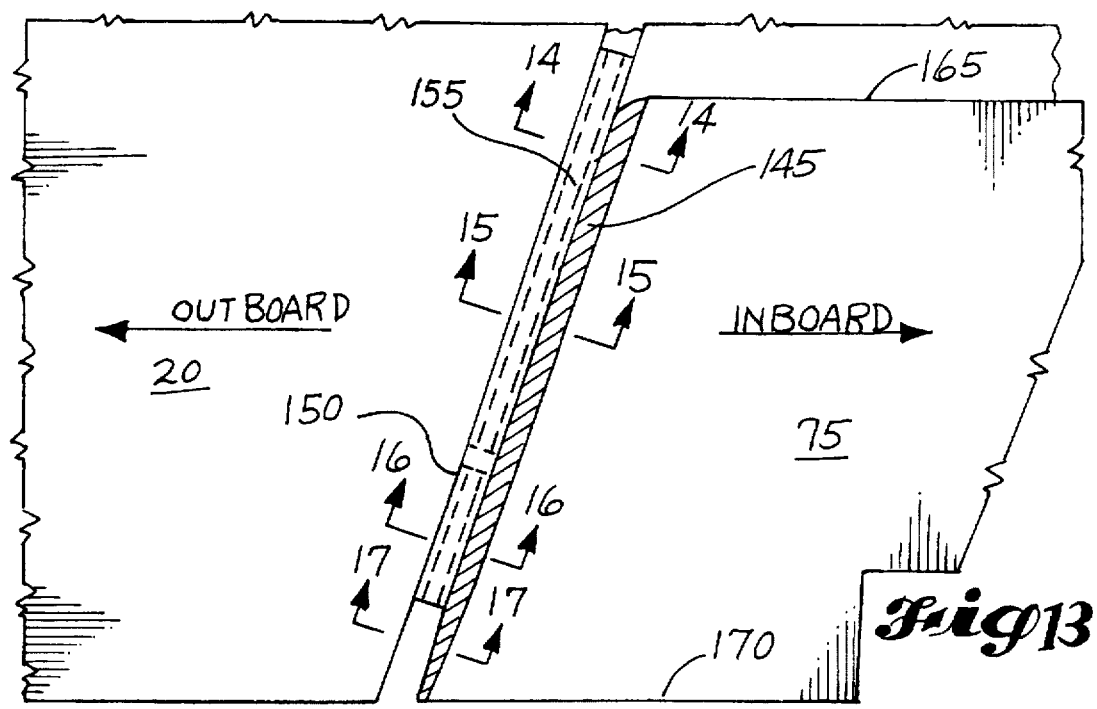

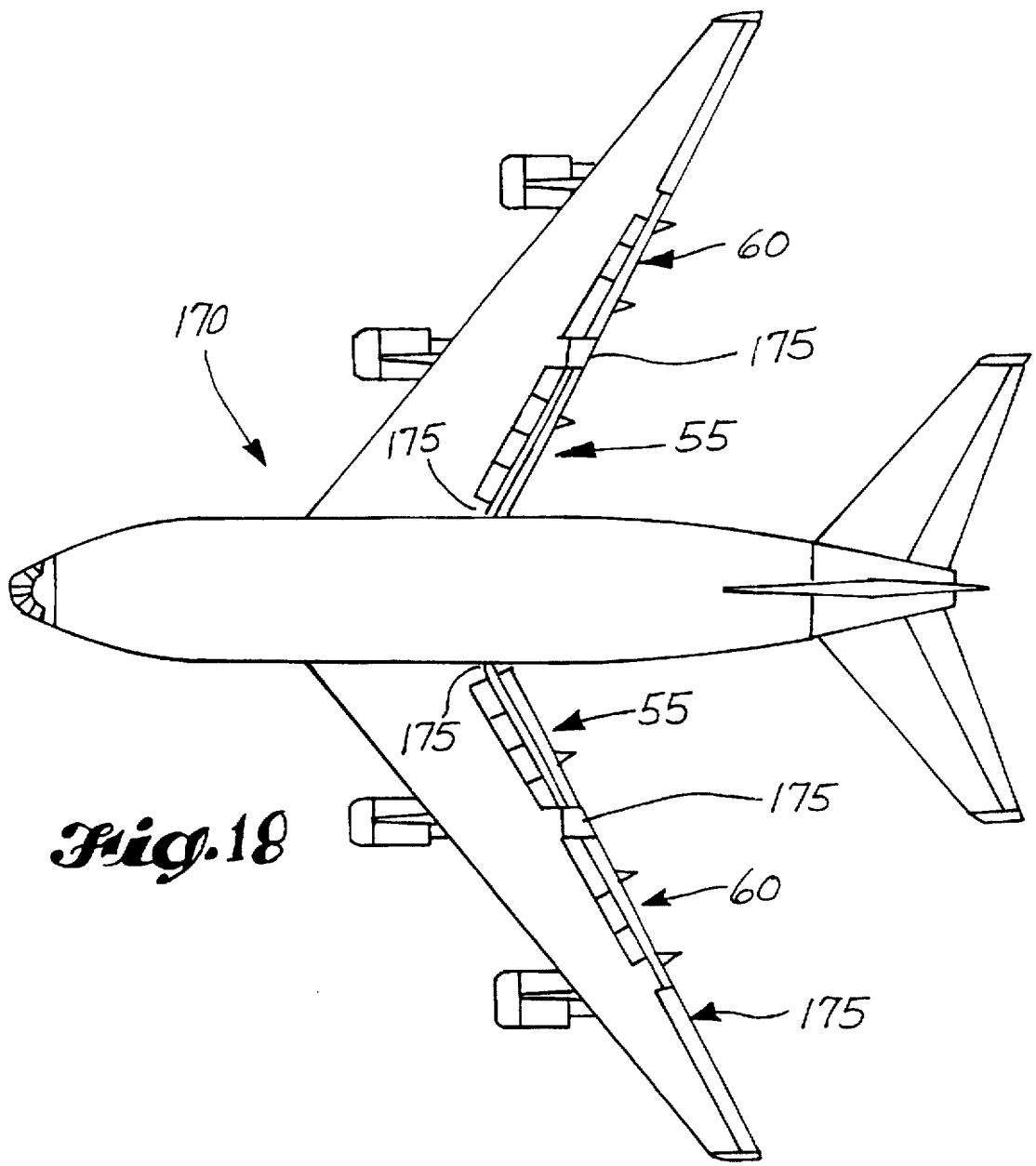

METHOD AND APPARATUS FOR REDUCING AIRFRAME AEROSOUND

TECHNICAL FIELD

This invention relates to a method and apparatus for reducing noise or aerosound produced by the airframe of an airplane moving in a fluid. More particularly, the present invention relates to the provision of a flap edge cap having a smooth, continuous, arcuate, surface for reducing noise produced by the flap edge when the edge is exposed to the fluid during certain flight conditions.

BACKGROUND OF THE INVENTION

Civil aviation agencies all over the world, in response to public demands, are establishing more stringent noise standards for newly designed airplanes. These new standards apply to the noise levels produced by the airplane when it takes off and when it lands, i.e., during departure and approach conditions.

The airplane's airframe and powerplants or engines produce varying amounts of objectionable audible noises during each of the above described flight conditions. During departure, the engines produce most of the noise. In contrast, airframe noise is a much greater factor during the approach condition when high lift systems, such as wing leading edge devices and wing trailing edge flap systems, are extended and the engines are operating at low thrust levels or at idle power. Recent advances in powerplant technology have reduced engine noise significantly during both flight conditions. Therefore, airframe noise has become a more dominant source of aerosound when an airplane is landing.

Airframe noise is generated by a fluid, such as air, flowing over the airplane's fuselage, landing gear, wing, and wing leading-edge, high-lift device and trailing edge flap systems. The most audible noise produced by the flap systems occur on approach when the flaps are extended and lateral flap edges are exposed to the fluid. It is believed that the flap aerosound is generated by vortices caused by high pressure fluid flowing from the lower surface of the flap around any exposed lateral flap edge to the upper surface of the flap. Tests indicate that primary and secondary vortices may be produced in a blunt flap edge exposed to a fluid. See "An Experimental Investigation of Wing Tip Turbulence with Applications to Aerosound," S. A. McInerny, W. C. Meecham and P. T. Soderman, AIAA Paper 86-1918, AIAA 10th Aeroacoustics Conference, Seattle, Wash., Jul. 9-11, 1986. Experiments conducted by the inventors herein suggest that if the secondary vortices are attenuated or substantially eliminated, noise created by the flap edges may be reduced. Those tests also indicate that the secondary vortices contribute to undesirable aerosound along with primary vortices.

In the past, various approaches have been taken to attenuate vortices produced by flaps and other lifting surfaces in order to decrease drag, maintain or increase lift, or decrease lethal phenomena associated with strong vortices produced by large, heavy airplanes at slow speeds during departure and approach. For example, the vortex generator of U.S. Pat. No. 3,596,854, issued Aug. 3, 1971, to Haney directs the high pressure fluid flowing from the lower surface of a wing tip, aileron outboard tip or outboard edge of any other aero surface structure into a slot formed in a tubular housing attached to the structure. The entrained high pressure fluid is swirled within the housing and discharged from the trailing edge of the structure. The Coanda surface tip of U.S. Pat. No. 5,158,252, issued Oct. 27, 1992, to Taylor stems tip vortex generation by forming a fluid barrier perpendicular to a fluid foil plane (wing, flap, etc.). The barrier prevents crossflow from the higher pressure fluid region of the foil to the lower pressure fluid region of the foil. U.S. Pat. No. 4,477,042, issued Oct. 16, 1984, to Griswold discloses an end plate or fence positioned at the wing tip or flap edge which brings about a controlled mergence of fluid flows across the upper and lower foil surfaces of the wing or flap. This vortex control can be augmented by discharging fluid into the merging flows whereby a rapid dissipation of dangerous vortices in the wake of an airplane may be achieved.

The prior art discussed above is not concerned with noise alleviation although flap fences are known to substantially reduce aerosounds produced by an extended flap. See "Flap Noise Characteristics Measured by Pressure Cross-Correlation Techniques," W. R. Miller, Ph. D Thesis, UCLA 1980. However, the devices suggested above are unsatisfactory for a number of other reasons. For example, to a greater or lesser degree, the devices of Haney, Griswold, and Taylor increase the overall weight of the wing, increase drag produced by flaps under certain flight conditions, increase complexity, are more difficult to maintain, and increase design, manufacturing, maintenance, and operating costs. As a consequence, these devices are generally not used on most commercial airplanes to attenuate noise.

A rounded flap edge cap has been tested to determine its effectiveness in attenuating noise produced by the flap during approach conditions of an airplane. However, these tests indicated that a rounded flap edge cap is ineffective in reducing noise created by the flap during approach conditions. In contrast, tests performed by the inventors of the present invention suggest that a rounded flap edge cap can be effective in reducing a broad range of frequencies of objectionable aerosound produced during the approach condition.

OBJECTS OF THE INVENTION

It is therefore an object of the invention to reduce the aerosound made by an airplane airframe.

It is another object of the invention to provide a method and apparatus for reducing the noise made by an airplane moving through a fluid when the airplane's flap edges are exposed to the fluid.

It is still another object of the invention to provide an airplane flap edge, exposed to the fluid through which the airplane is moving, with a smooth, continuous, arcuate surface, such as a rounded surface, whereby airframe aerosound levels may be reduced when the airplane is landing.

SUMMARY OF THE INVENTION

The present invention provides a smooth, continuous, arcuate surface, such as a rounded end cap, for any airplane flap edge exposed to fluid having relative motion with respect to the airplane. Tests performed by the inventors herein indicate that a rounded flap edge cap is effective in attenuating noise levels in the middle and high frequency range, i.e., between about 500 to about 10000 Hz. It may be inferred from those tests that a flap edge modified in accordance with the principles of the present invention substantially attenuates or eliminates secondary vortices at the flap edge. The rounded flap edge cap is a simpler, lighter, less complicated and less costly solution to reducing aerosound made by the airframe of an airplane during the approach condition than has heretofore been provided in the prior art.

3

BRIEF DESCRIPTION OF THE DRAWINGS

FIG. 5 is an enlarged view of the trailing edge flap system of FIG. 4

FIG. 6 shows generalized air flow with vortex formation around the main outboard flap of the flap system of FIG. 5.

FIG. 7 is a simplified end view of the main outboard flap of FIG. 6 taken along lines 7—7 of FIG. 5 and illustrating the primary and secondary vortices that can be formed around the blunt flap edge.

FIG. 8 illustrates a conventional flap edge fence.

FIG. 9 is an inboard looking side view of the fence of FIG. 8 taken along lines 9—9 in FIG. 8.

FIG. 10 is the trailing edge flap system of FIG. 4 provided with a rounded flap edge cap of the present invention.

FIG. 11 is a simplified end view taken of the main outboard flap of FIG. 10 taken along lines 11—11 of FIG. 10 and illustrating the primary vortex that can be formed around the rounded flap edge cap of the present invention.

FIG. 13 shows a partial view of the undersurface of the left side wing of FIG. 4 under the area highlighted within box "B". FIG. 13 illustrates another embodiment of the present invention and novel bulb seals which may be used with the present invention.

FIG. 14 is a partial side view taken along lines 14—14 in FIG. 13

FIG. 15 is a partial side view taken along lines 15-14 in FIG. 13

FIG. 16 is a partial side view taken along lines 16—16 in FIG. 13

FIG. 17 is a partial side view taken along lines 17—17 in FIG. 13

FIG. 18 shows another airplane having left and right side wings which may be modified to incorporate the principles of the present invention.

DETAILED DESCRIPTION OF THE INVENTION

Figure 1:
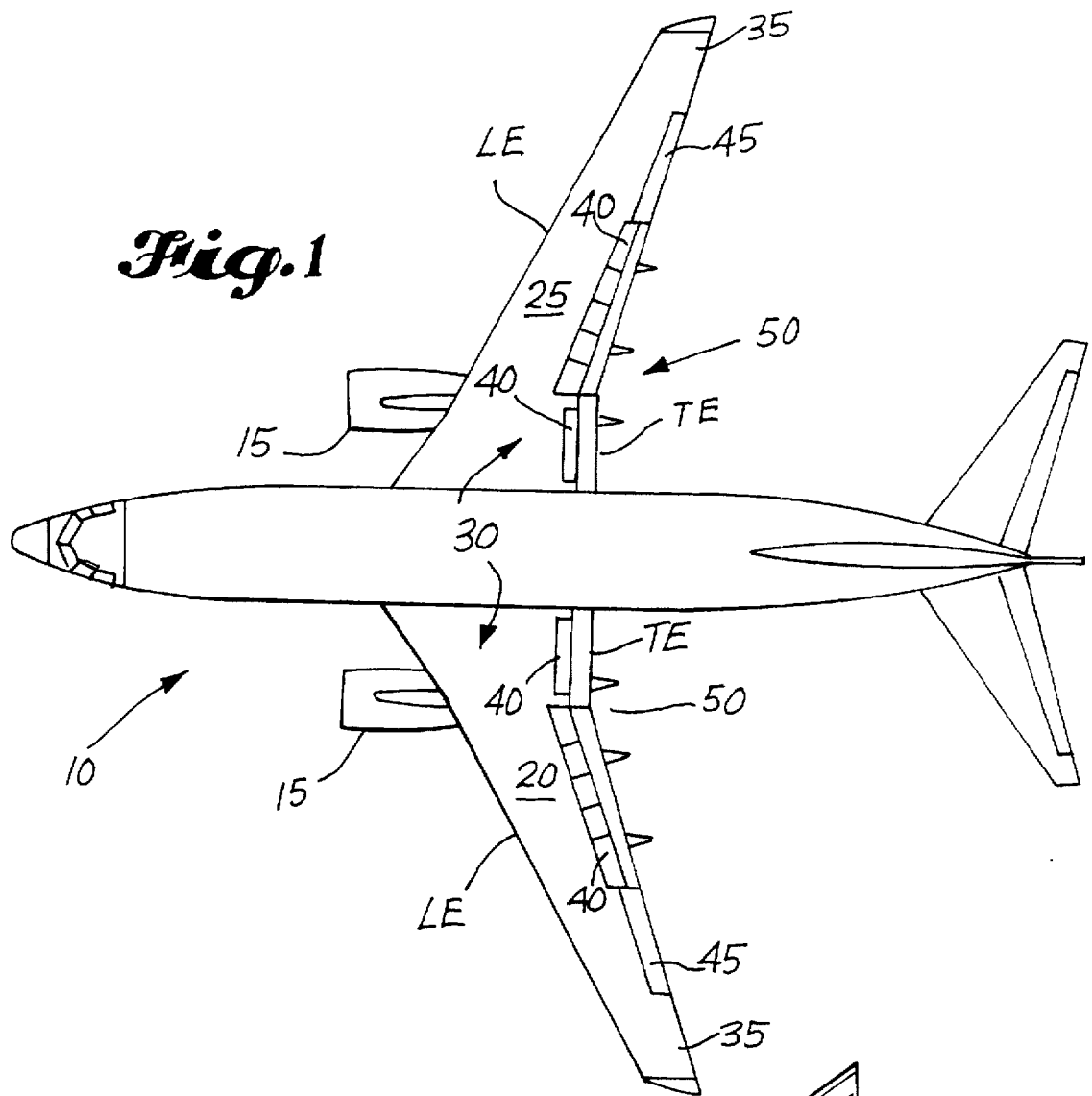
FIG. 1 shows a conventional airplane having left and right side wings.

In each of the figures that will be described, the same numerals are intended to represent the same or similar structure. Turning now to FIG. 1, there is illustrated a conventional airplane 10 having a pair of engines 15, a landing gear (not shown), a left side wing 20 and a right side wing 25. As is conventional, each wing 20, 25 has an inboard portion 30 and an outboard portion 35, a leading edge LE and a trailing edge TE. Each of the wings 20, 25 is also provided with a series of conventional control surfaces such as spoilers 40, at least one aileron 45, and a trailing edge flap system 50.

Airframe aerosound is a dominant source of noise from an airplane, like the one illustrated in FIG. 1, on landing approach when high lift systems, such as the leading edge devices (not shown) and the various flaps in the trailing edge flap system 50, are extended and the engines 15 are operating at low thrust levels. Knowledge of the locations of noise generation about the airplane 10 is paramount to understanding and reducing airframe noise.

Figure 2:
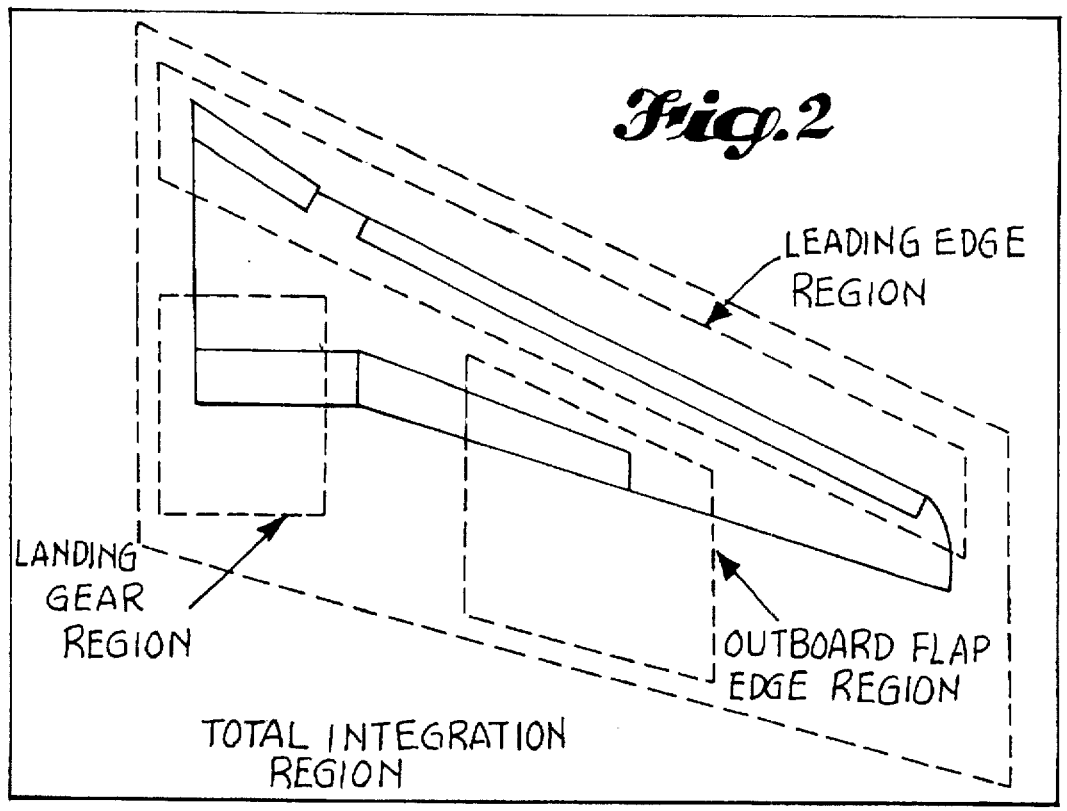
FIG. 2 shows various regions of the right side of the airplane of FIG. 1 where noise may be generated during the approach condition.

With this in mind, the inventors herein conducted a unique series of wind tunnel tests using scale models of the airplane 10 of FIG. 1. The test program objectives included recording airframe noise components for various wing and landing gear configurations (see FIG. 2) in conditions simulating approach conditions of the airplane 10. An elliptical mirror microphone system (not shown) was used to provide maps (not shown) of noise source strengths for the total integration region, i.e., the leading edge region of the right side wing 25, gear region and a region selected at the outboard lateral blunt edge of a flap in the trailing edge flap system 50. The maps are convincing pictures of noise components and illustrate how noise reduction design concepts affect specific noise generation regions of the wing 25.

Figure 3:
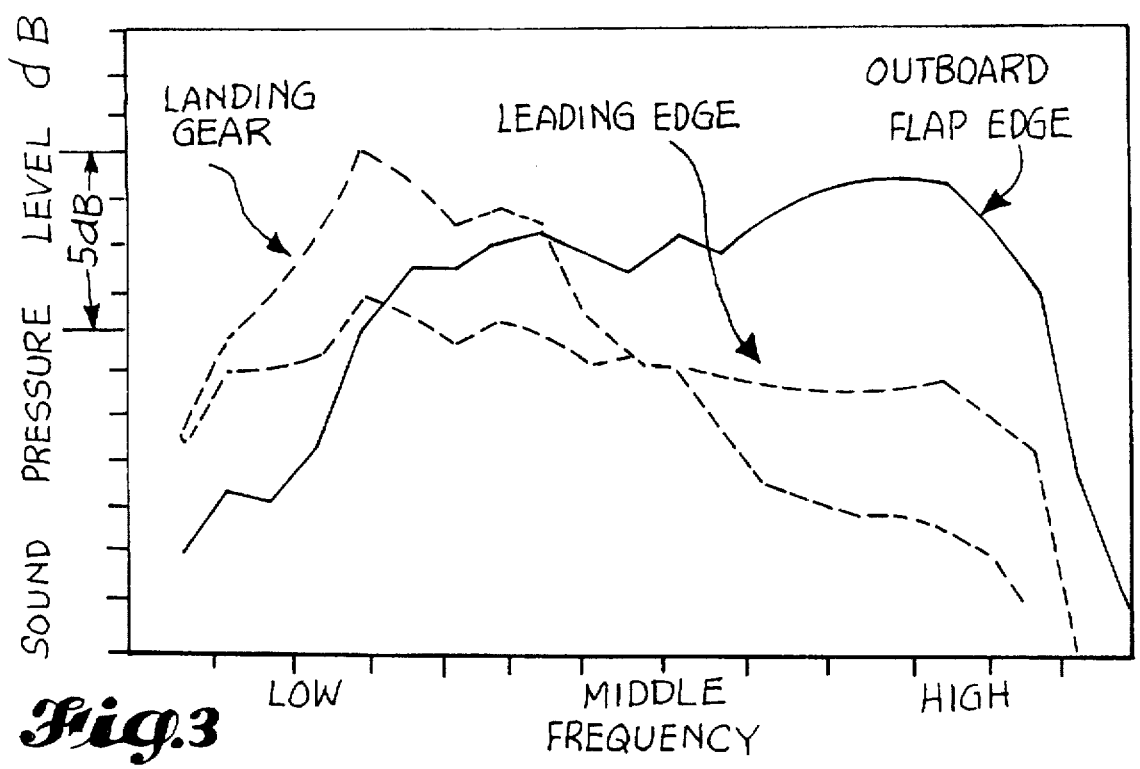
FIG. 3. represents the qualitative noise levels measured at the regions identified in FIG. 2.

It is generally accepted that various hardware components of a wing generate noise in specific ranges of frequency. This was confirmed by the series of wind tunnel tests performed by the instant inventors. Individual regions of the noise source strength maps are assumed to be independent distributions of noise source strength density. Using this assumption, the noise level distribution within a specified region can be integrated to obtain spectral information for each independent region (mentioned above) about the wing. For example, data from individual regions for one airplane configuration are shown in FIG. 3. This information can be used to determine the relative noise source levels and frequencies of various components of the wing. For most of the configurations tested, the landing gear noise source dominated low frequencies, leading edge devices generated significant noise in middle frequencies, and the outboard lateral flap edge noise source dominated high frequencies and part of middle frequencies as shown by the resultant spectra in FIG. 3. As used herein low frequencies range from about 400 Hz to about 1600 Hz, middle frequencies range between about 1600 and 4000 Hz and high frequencies range from about 4000 to about 10000 Hz. Thus, one of the most important airframe noise subcomponents is generated at flap edges.

Figure 4:
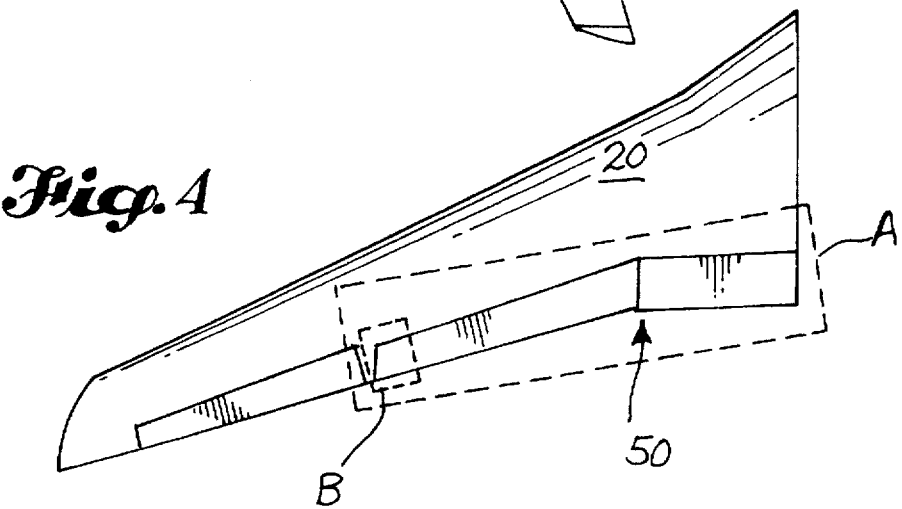
FIG. 4 depicts the trailing edge flap system of the left side wing highlighted within box "A".

The trailing edge flap system 50 for the left side wing 20 is highlighted within box "A" in FIG. 4. As better shown in FIG. 5, the trailing edge flap system 50, which extends from the inboard wing portion 30 proximate to the outboard portion 35, comprises an inboard flap subassembly 55 and an outboard flap assembly 60. The inboard flap subassembly 55 is positioned proximate the inboard wing portion 30 and comprises an main inboard flap 65 and an aft inboard flap 70. The outboard flap subassembly 60 comprises a main outboard flap 75 and an aft outboard flap 80. Each of the flap subassemblies 55, 60 operate in a conventional manner using conventional mechanisms (not shown) that can deploy the flaps when necessary during the approach condition of the airplane 10. Each main and aft inboard and outboard flaps 65, 70, 75, and 80, respectively, are configured in the form of an airfoil and comprises an upper surface 85, a lower surface 90, and at least one blunt lateral edge 95. The cross sectional airfoil shape of the main outboard flap 75 has been simplified in FIG. 7 for the purposes of clarity and discussion only.

As discussed above and well illustrated in FIG. 3, blunt flap edges 95 are a large contributor of aerosound when the airplane 10 is in its approach for a landing. Flap edge noise is generated by surface pressure fluctuations (i.e., unsteady lift forces) near the lateral edge 95 of deployed flaps such as main outboard flap 75. Noise sources located near flap edges are related to the vortices formed there and at any blunt edge of any flap exposed to the air through which the airplane 10 is moving. For example, it can be seen from FIGS. 6 and 7, that high pressure air moving from the lower surface 90 of the main outboard flap 75 wraps around the blunt flap edge 95 to the upper surface 85 of that flap and creates a primary vortex 100 and secondary vortices 105 (only the resultant vortex 110 is shown in FIG. 6). The secondary vortices 105 are produced at the sharp lower outer extremity 115 of the edge 95 and the sharp upper outer extremity 120 of the flap edge 95. The vortex generation process is inherently unsteady due to coupling with upstream turbulence. This same phenomenon occurs at the aft outboard flap 80 as well during landing. Tests conducted by the present inventors indicate that the secondary vortices 105 produce significant noise along with the primary vortex 100.

The Miller thesis described above determined that flap fences reduce flap noise. As shown in FIGS. 8 and 9, a conventional flap edge fence 125 can be shown to comprise a vertical plate affixed to the lower surface 130 of the left wing 20 proximate the outboard flap subassembly 60. The flap fence 125 is dimensioned to extend rearwardly to a point that coincides with the trailing edge 135 of the aft outboard flap 80 when that flap is fully deployed during landing. Depending upon its configuration, the flap edge fence 125 can be used to effectively attenuate the primary vortex 100 and the secondary vortices 105 produced at the outboard lateral blunt edges 95 of conventional flaps. It is believed that the flap fence 125 keeps the resultant vortex 110 formed on the blunt flap edge 95 from attaching to the top surface of each flap 75, 80, reduces pressure fluctuations and thereby reduces the noise levels produced by the flaps. However, a flap fence 125 is perceived as unsatisfactory because it adds weight to the airframe, is difficult to manufacture and maintain, increases drag at certain air speeds, and therefore increases overall manufacturing, maintenance and operating costs of an airplane.

A rounded flap edge configuration of the present invention is shown schematically in FIGS. 10 and 11. This configuration reduced noise levels in the tests performed by the present inventors (see FIG. 12). As better shown in FIG. 11, the outboard lateral edge of the outboard main flap 75 is provided with a rounded flap edge cap 140 which extends between the sharp lower outer extremity 115 and the sharp upper outer extremity 120 of the lateral edge of the flap 75. It is believed that this cap 140 reduces noise levels because the sharp edges at the upper and lower flap surfaces 115, 120, respectively, are removed thereby removing a noise source controlled by the secondary vortices 105.

Figure 12:
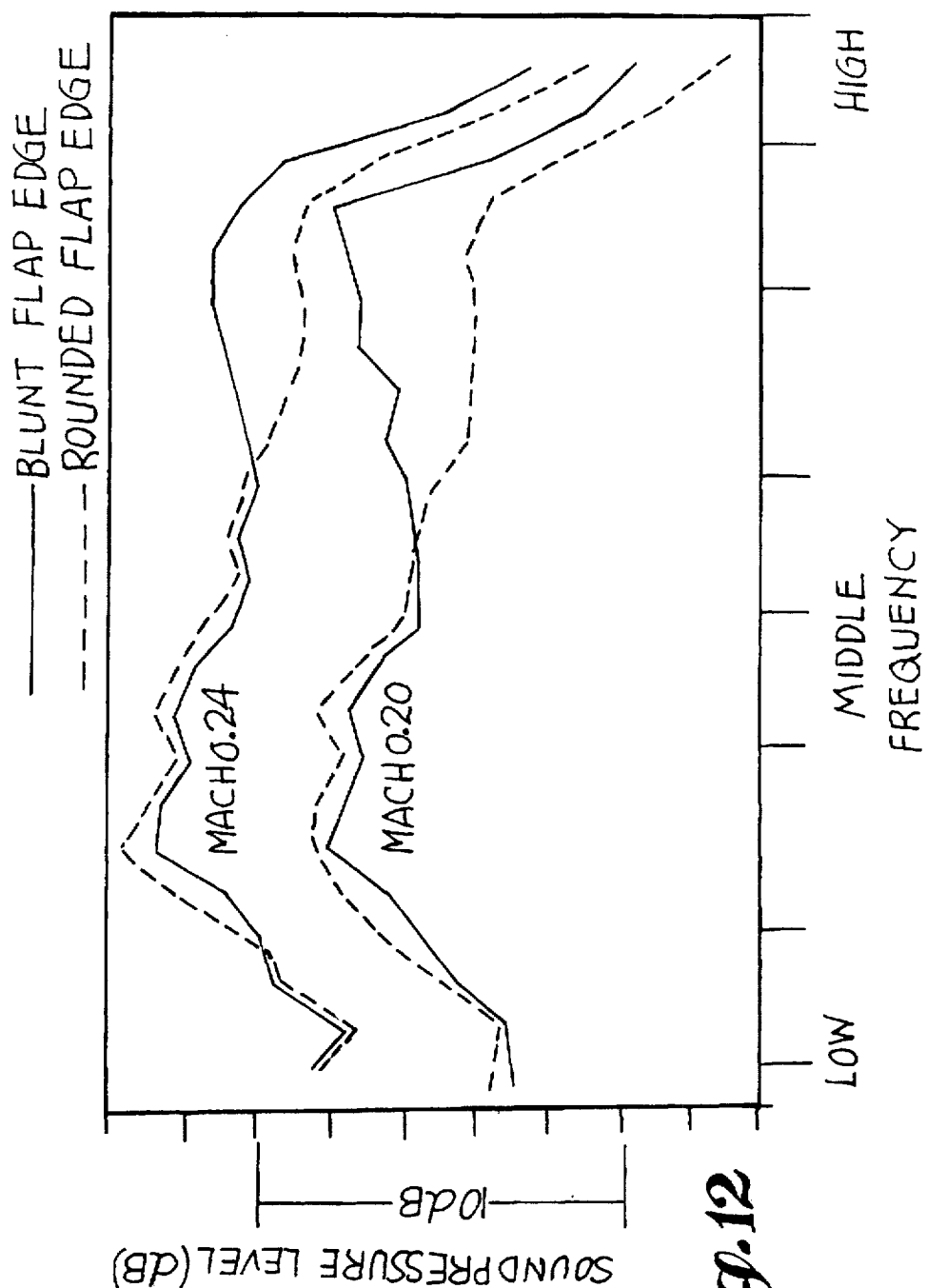
FIG. 12 shows a comparison of the noise levels produced by a conventional blunt flap edge and a rounded flap edge cap of the present invention at low, middle and high frequencies at two Mach numbers.

FIG. 12 compares the rounded flap edge cap 140 of the present invention with a conventional blunt flap edge 95. As shown in that figure, a rounded flap edge cap 140 does not appear to reduce noise levels at the low frequencies. This low frequency data is similar to that obtained by others who concluded from their low frequency data that a rounded flap edge would be ineffective in reducing aerosounds during approach conditions.

In contrast, using the equipment generally described above, it has been discovered that a rounded flap edge cap 140, compared to a blunt edge 95, reduces noise by as much as 3 decibels in both high and middle frequencies. The tests indicated that a rounded flap edge cap 140 is effective in attenuating noise levels in the middle and high frequency range, i.e., between about 500 to about 10000 Hz. Fortunately the engine noise level dominates the low frequency range at landing and effectively masks airframe noise made by the flaps. The airframe noise levels within the middle and high frequency ranges are most perceptible by humans and this is the frequency range where the present invention is most effective. Test data is shown in FIG. 12 for two different approach Mach numbers. As can be seen, the noise generated at a flap edge varies with Mach number.

The flap edge cap 140 need not be rounded as is shown in FIG. 11. Other configurations of the flap edge cap of the present invention are possible as would be obvious to one of ordinary skill in the art. Any smooth, continuous, arcuate lateral surface, extending between the lower surface of a flap to the upper surface of the flap should achieve the desired noise attenuation contemplated by the present invention. For example, another embodiment of the present invention is illustrated in FIGS. 13-17. FIG. 13 is an enlargement of the area highlighted by box "B" identified in FIG. 4 and depicts the general interface between the second embodiment of the present invention and a fixed portion of the wing 20 outboard of the trailing edge flap system 50 as viewed from underneath the left side wing 20.

More particularly, FIG. 13 shows an outboard main flap edge cap 145 disposed on the outboard lateral edge of the outboard main flap 75 contacting a pair of bulb seals 150, 155 affixed to supporting structure 160 on the outboard wing 20. As can be seen from FIGS. 14-17, the flap edge cap 145 has a smooth, continuous, arcuate surface which varies in geometry from the leading edge 165 of the outboard main flap 75 to the trailing edge 170 of the flap 75. The bulb seals 150, 155 substantially seal the flap edge cap 145 along the length of the chord of the outboard main flap 75 to reduce parasitic drag. Typically, blade seals (not shown) would be used to seal the blunt lateral edge of a flap. However, a blade seal would not effectively prevent parasitic drag if used with a flap edge cap (either 140 or 145) of the present invention.

While the flap edge caps of the present invention have been generally discussed with reference to the outboard lateral edge of the main flap 75 of the outboard flap subassembly 60, it will be obvious to one of ordinary skill in the art, that the flap edge caps 140, 145 may be used whenever a lateral edge of any flap is exposed to the airstreams moving over the wings 20, 25. For example, the inboard flap systems 55 and the outboard flap systems 60 of the airplane 170 of FIG. 18 would have a number of flap edges exposed during landing because all of the flaps of each system are located next to airframe structure 175 (such as e.g., ailerons or flaperons) that is not deployed during approach or is fixed.

While preferred embodiments of the present invention have been illustrated and described, it should be understood that variations could be made therein without departing from the spirit and scope of the invention. Accordingly, it is to be understood that the invention is not to be limited to the specific embodiments illustrated and described. Rather the true scope and spirit of the invention is to be determined by reference to the following claims.

The embodiments of the invention in which an exclusive property or privilege is claimed are defined as follows:

1. In an airplane wing having an inboard portion and an outboard portion, an upper wing surface, a lower wing surface, and a trailing edge formed at the juncture of said upper and lower surfaces, said wing being capable of relative motion through a fluid, an apparatus for reducing noise levels created by said wing when said wing is moving through said fluid, comprising:

a flap positioned at said trailing edge on said wing and disposed between said inboard portion and said outboard portion of said wing, said flap having an upper surface, a lower surface and at least one lateral edge exposed to said fluid when said airplane is landing, and a smooth, arcuate, continuously convex-shaped surface formed at said lateral edge of said flap, whereby as fluid moves from said flap lower surface to the upper surface of said flap a primary vortex is produced, said arcuate surface substantially reducing any noise-generating secondary vortices that may be produced by said flap edge when said edge is exposed to said fluid.

2. The wing of claim 1, wherein said arcuate surface is substantially rounded.

3. The wing of claim 2, wherein said rounded surface has a substantially semicircular cross section.

4. The wing of claim 1, wherein a plurality of bulb seals are disposed between said arcuate surface and fixed structure of said wing.

5. A method for reducing noise created by an airplane wing when said wing is moving through a fluid, said wing having an inboard portion and an outboard portion, an upper wing surface, a lower wing surface, and a trailing edge formed at the juncture of said upper and lower surfaces, said wing being capable of relative motion through a fluid, comprising the steps of:

positioning a flap at said trailing edge on said wing, disposing said flap between said inboard portion and said outboard portion of said wing, providing said flap with an upper surface, a lower surface and at least one lateral edge exposed to said fluid when said airplane is landing, and forming a smooth, arcuate, continuously convex-shaped surface at said lateral edge of said flap, whereby as fluid moves from said flap lower surface to the upper surface of said flap a primary vortex is produced and said arcuate surface substantially reduces any noise-generating secondary vortices that may be produced by said flap when said flap lateral edge is exposed to said fluid.

6. The method of claim 5, comprising the step of forming said smooth continuous surface as a substantially rounded edge.

7. The method of claim 6, comprising the step of forming said rounded edge to have a substantially semicircular cross section.

8. The method of claim 5, comprising the step of disposing a bulb seal between said arcuate surface and fixed structure of said wing.

9. The wing of claim 3, wherein a plurality of bulb seals are disposed between said rounded surface and fixed structure of said wing.

10. In an airplane wing having an inboard portion and an outboard portion, an upper wing surface, a lower wing surface, and a trailing edge formed at the juncture of said upper and lower surfaces, said wing being capable of relative motion through a fluid, an apparatus for reducing noise levels created by said wing when said wing is moving through said fluid, comprising:

a flap positioned at said trailing edge on said wing and disposed between said inboard portion and said outboard portion of said wing, said flap having an upper surface, a lower surface and a lateral edge exposed to said fluid when said airplane is landing, and a smooth, continuous, arcuate rounded surface formed at said lateral edge of said flap, said rounded surface having a semicircular cross section, whereby as fluid moves from said flap lower surface to the upper surface of said flap, said arcuate surface reduces turbulence in said fluid.

11. A method for reducing noise created by an airplane wing when said wing is moving through a fluid, said wing having an inboard portion and an outboard portion, an upper wing surface, a lower wing surface, and a trailing edge formed at the juncture of said upper and lower surfaces, said wing being capable of relative motion through a fluid, comprising the steps of:

positioning a flap at said trailing edge on said wing, disposing said flap between said inboard portion and said outboard portion of said wing, providing said flap with an upper surface, a lower surface and a lateral edge exposed to said fluid when said airplane is landing, and forming a smooth, continuous, substantially rounded surface at said lateral edge of said flap, said rounded surface being formed to have a semicircular cross section, whereby as fluid moves from said flap lower surface to the upper surface of said flap, said arcuate surface reduces turbulence in said fluid.

* * * * *